Patented Jan. 2, 1940

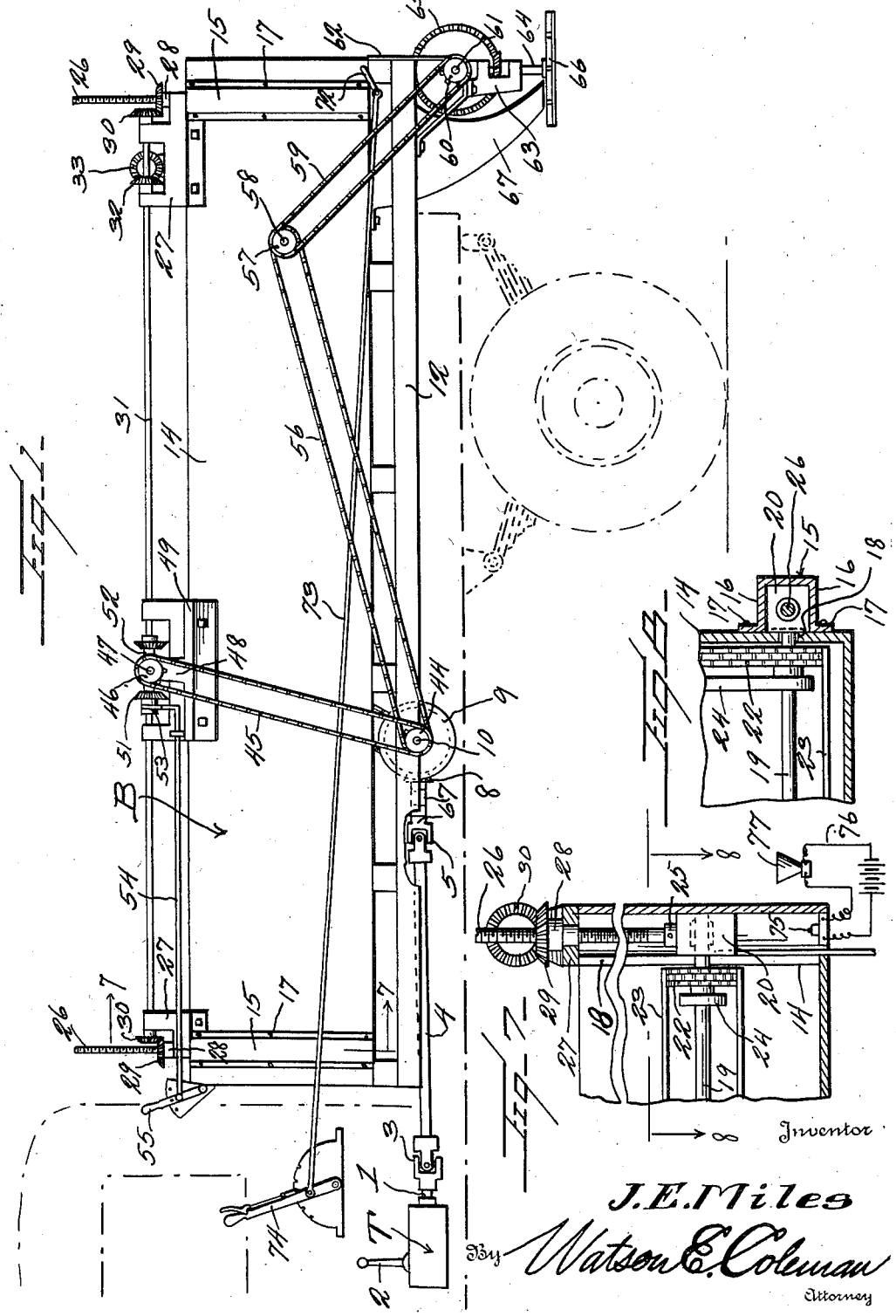

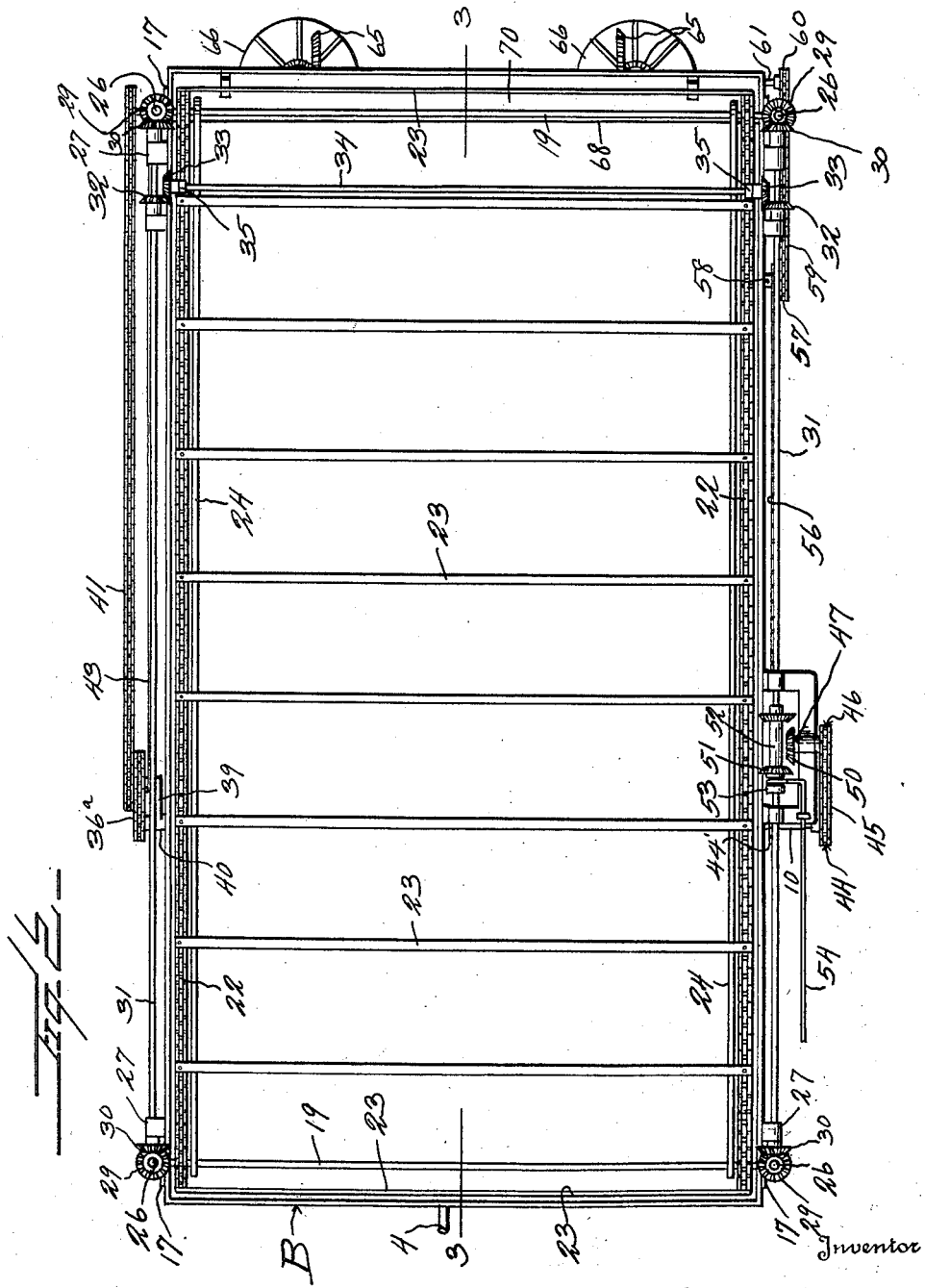

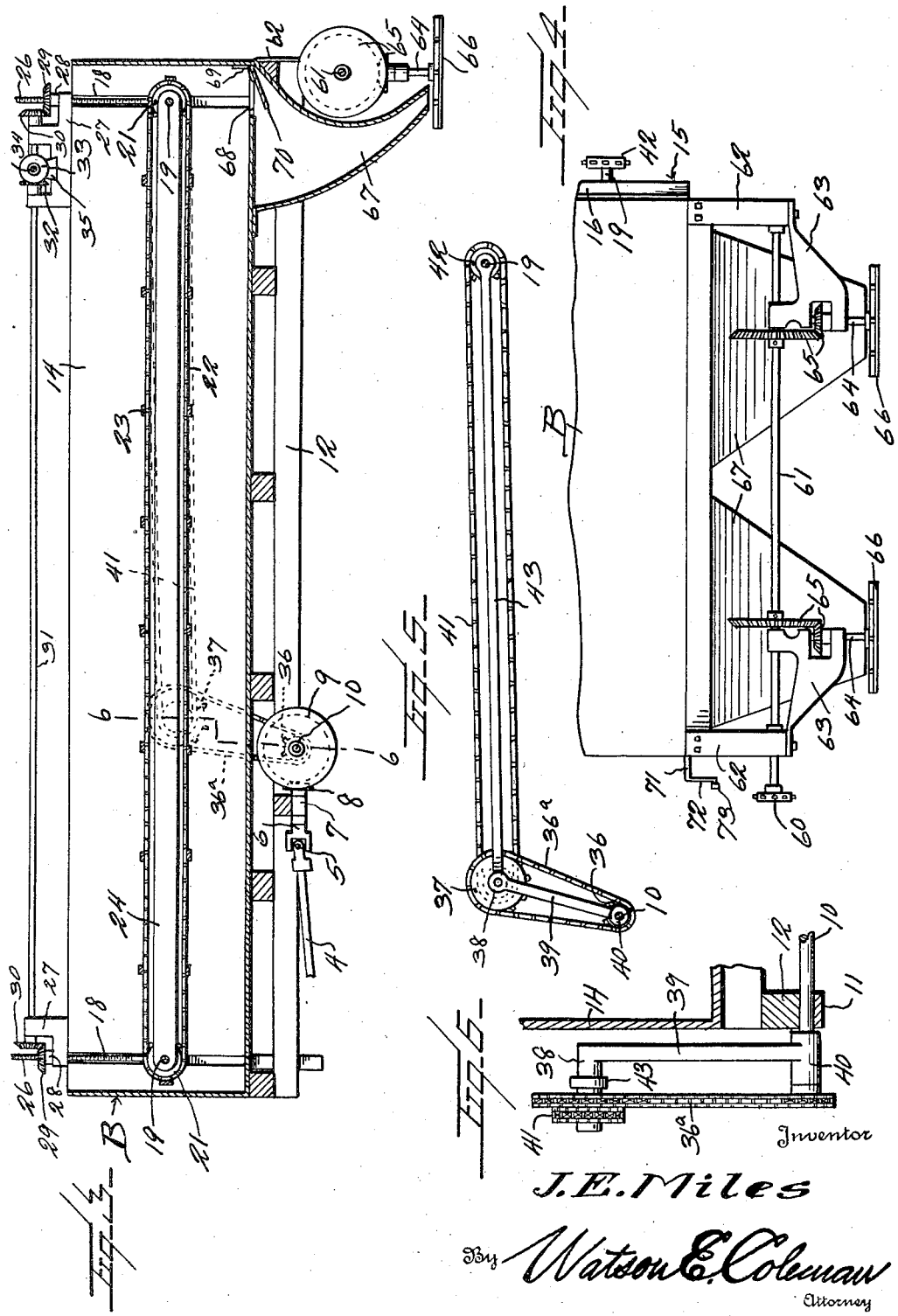

2,185,415

UNITED STATES PATENT OFFICE 2,185,415

MACHINE FOR SPREADING PULVERIZED MATERIALS

James E. Miles, Madison, Ind.

Application August 20, 1938, Serial No. 225,995

3 Claims. (Cl. 275—3)

This machine relates to a machine for spreading pulverized material such as lime, phosphate and the like, and it is an object of the invention to provide a machine of this kind which comprises a motor driven truck having arranged thereon means for effectively spreading the material and wherein such means embodies movable parts in driven connection with the power take-off shaft comprised in the transmission.

It is also an object of the invention to provide means for spreading agricultural lime and the like without requiring shovelling or other manual labor wherein said spreading is at all times under control of the driver in the cab of the vehicle.

Another object of the invention is to provide an apparatus of this kind including a conveyor working on top of the load within the truck or vehicle body, said conveyor serving to skim off the top of the material and carry the same to the rear of the truck or vehicle body for discharge in a manner whereby the material may be spread upon the ground by the action of broadcasting fans.

A further object of the invention is to provide an apparatus of this kind wherein the material within the body of a truck or kindred vehicle is effectively delivered therefrom for spreading upon the ground and wherein means are provided to give warning when the material has been substantially entirely discharged from the body.

The invention also has for an object to provide an apparatus of this kind wherein the means for delivering the material may be removed when desired to allow the truck or kindred vehicle to be used for general purposes.

The invention consists in the details of construction and in the combination and arrangement of the several parts of my improved machine for spreading pulverized material whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein—

Figure 1 is a view in side elevation and of somewhat a diagrammatic character illustrating a spreading apparatus constructed in accordance with an embodiment of my invention;

Figure 2 is a view in top plan of the structure as illustrated in Figure 1 with certain of the parts omitted;

Figure 3 is a vertical sectional view taken substantially on the line 3—3 of Figure 2;

Figure 4 is a view in end elevation of the structure as illustrated in Figure 1 with a portion broken away;

Figure 5 is a detailed view partly in section and partly in elevation illustrating the assembly of the driving chains for the conveyor;

Figure 6 is a sectional view taken substantially on the line 6—6 of Figure 3;

Figure 7 is a fragmentary sectional view taken substantially on the line 7—7 of Figure 1, a signalling means being diagrammatically illustrated;

Figure 8 is a detailed sectional view taken substantially on the line 8—8 of Figure 7.

As disclosed in the accompanying drawings, B denotes a body of a truck or kindred vehicle of conventional construction and wherein the truck structure includes a transmission T of a type including a power take-off shaft 1. This transmission is provided with a conventional operating lever 2 operated in the usual way by the driver or operator within the cab of the vehicle.

The power shaft 1 is in universal connection, as at 3, with a shaft 4 of desired length and extending rearwardly below the body B and in universal connection, as at 5, with a shaft 6 rotatably supported by the bearing 7 depending from the body structure B.

This shaft 6 carries a gear 8 which meshes with a gear 9, as indicated by broken lines in Figures 1 and 3, fixed to the shaft 10 extending transversely across the body B and extending beyond opposite sides thereof. Each end portion of this shaft 10 is rotatably supported, as at 11, by the side bolster 12 comprised in the body structure B.

The corner portions of the body B have secured to the side walls 14 thereof and exteriorly of the body the vertically disposed guide members 15 each substantially U-shaped in cross section with its base wall outwardly disposed. The free longitudinal margins of the side wall 16 of each of these members 15, as herein disclosed, are defined by the outstanding flanges 17 bolted or otherwise secured to the adjacent side wall 14 of the body structure B. These members 15 have their opposite end portions open and in communication with the interior of each member 15 is an elongated slot 18 provided in the adjacent wall 14.

The slots 18 at each end of the body structure B are in transverse alignment and extending through the slots 18 of each pair are the extremities of a shaft 19 which are rotatably engaged with the bearing blocks 20 snugly engaging within the adjacent members 15 but free to move up and down therein. Each of the shafts 19 closely adjacent to the side wall 14 of the body structure B has fixed thereto the sprocket wheels 21. Operatively engaged with the sprocket wheels 21 at each side of the body B is an endless chain 22.

The chains 22, as is believed to be obvious, are at the opposite sides of the body B inwardly of but closely adjacent to the side walls 14. These chains are connected by the transversely disposed cleats or strips 23 spaced apart a desired distance in a direction lengthwise of the chains.

In the present embodiment of my invention the shafts 19 are connected by the elongated rigid members 24 which serve to prevent undue frictional resistance being offered to the bearing blocks 20 in their up and down movements.

Suitably connected, as at 25, with the upper portions of the blocks 20 are the upstanding elongated shanks 26 which pass upwardly through the castings 27 suitably mounted at proper locations on the upper portions of the side walls 14. Threading on these shanks 26 and bearing from above on portions of the castings 27 are the sleeves 28. These sleeves 28 carry for rotation therewith the gears 29. The gears 29 at each side of the body structure B engage from below the gears 30 carried by the opposite end portions of the shafts 31 rotatably engaged with the castings 27.

The shafts 31 at their rear portions also have fixed for rotation therewith gears 32 which mesh with the gears 33 carried by the opposite end portions of the transversely disposed shaft 34 whereby the shafts 31 are connected for unitary rotation to effect a similar raising and lowering of all of the bearing blocks 20. This shaft 34 is suitably supported by upstanding bearing arms 35 carried by the castings 27 although it may be otherwise mounted.

The shaft 10 at one end thereof carries for rotation therewith a sprocket 36 with which is engaged an endless chain 36ª which also engages around a sprocket 37 rotatably mounted on an outwardly and laterally disposed stub shaft 38 carried by one end portion of a rigid arm 39. The opposite end portion of this arm 39 is freely mounted, as at 40, for rocking movement on the shaft 10 with the arm 39 upwardly directed. The sprocket 37 is of a double type and also has engaged therewith a second sprocket chain 41 which is also disposed around a sprocket 42 carried by an end portion of the rear shaft 19 for the chains 22. Also freely engaged with this stub shaft 38 is an end portion of an elongated rigid rod 43 which is also freely engaged with the rear shaft 19. By means of this particular mounting of the chains 36ª and 41 the rear shaft 19 will be driven irrespective of the various positions of the endless chains 22 as they are raised and lowered with the blocks 20.

The end portion of the shaft 10 remote from the sprocket 36 carries a sprocket 44 with which is operatively engaged an endless chain 45. This chain 45 extends upwardly and is engaged with a sprocket 46 carried by a stub shaft 47 rotatably supported by an upstanding bearing arm 48 comprised in the bracket 49 secured to the upper portion of the adjacent side wall 14 of the body structure B. This shaft 47 is outwardly of and at right angles to the adjacent shaft 31 and the inner end of this shaft 47 carries a gear 50 positioned between the gears 51 spaced lengthwise on a sleeve 52. This sleeve 52 is keyed for rotation with the shaft 31 just mentioned but free for movement lengthwise thereof so that upon engagement of the required gear 51 with the gear 50 the shaft 31 may be caused to rotate in a direction resulting in a downward travel of the bearing blocks 20 or an upward movement. The sleeve 52 has engaged therewith in a conventional manner, as at 53, a shifting rod 54 leading to an operating lever 55 positioned for ready access by the driver or other occupant of the cab of the truck so that desired adjustment of the sleeve 52 may be effected as required.

The shaft 10 also has engaged therewith, as at 44', an endless chain 56 which is operatively engaged with a double sprocket 57 rotatably supported by a stub shaft 58 extending outwardly from the adjacent side wall of the body structure B closely adjacent to the rear thereof. This sprocket 57 also has engaged therewith a sprocket chain 59 which extends downwardly and rearwardly and engages a sprocket 60 carried by a transversely disposed shaft 61. This shaft 61 is rotatably supported by the brackets 62 depending from the rear portion of the body structure B at opposite sides thereof. These brackets 62 and the shaft 61 support inwardly disposed bearing members 63. These members 63 rotatably support the depending shafts 64 having their upper end portions in driven connection through the gears 65 on the shaft 61. The lower end portions of the shafts 64 carry the broadcasting fans 66.

The shafts 64 are so positioned and the broadcasting fans 66 are of such radii as to bring the forward portions of the fans 66 below but closely adjacent to the depending delivery chutes 67 carried by the rear portion of the body structure B. These chutes 67 are in communication, as at 68, with the body structure B immediately adjacent to the rear wall 69 thereof so that the material skimmed off from the top of the load within the body B will be caused to drop into the chutes 67 and be discharged upon the fans 66 whereby the material, such as agricultural lime, will be evenly distributed over the ground surface.

Each of the communications 68 is under control of a flap valve 70. These valves 70 are carried by a common rock shaft 71 rotatably supported by the body structure B and extending transversely thereof. One end portion of this shaft 71 extends outwardly to one side of the body B and said extended portion carries a crank arm 72 with which is engaged a rod 73. This rod 73 leads to a suitably mounted lever 74 positioned within ready access by the occupant of the cab of the truck whereby said valves 70 may be thrown into open or closed position as desired.

In practice, the truck with my improved apparatus thereon is intended to have the body B loaded with pulverized lime or kindred comminuted fertilizer at a suitable source of supply, such as a warehouse, it being understood, however, that during the filling the blocks 20 will be at their uppermost position so that the cross members or cleats 23 connecting the lower stretches of the chains 22 will rest upon the top of the load. At this time it is also to be understood that the sleeve 52 will be adjusted to place the gears 51 in a neutral position as illustrated in Figure 2. The load is then carried to the farm or other acreage upon which the material is to be spread and upon reaching such destination it is only necessary for the driver or other occupant of the cab of the truck to operate the lever 55 to move the sleeve 52 in the proper direction to effect an engagement between the gear 47 and a gear 51 to cause the shafts 31 to rotate in the proper direction to effect a downward movement of the blocks 20. It is believed to be obvious that this downward movement of the blocks 20 is relatively slow. The lever 74 will also be properly operated to open the valves 70 and, of course, the lever 2 of the transmission T will be so operated to assure the desired action of the power take-off shaft 1.

As is believed to be obvious, the members 23 of the lower stretches of the chains 22 will skim the top of the load within the body B and carry such material to the rear end of the body structure so that the same will drop into the chutes 67 for broadcasting or spreading by the fans 66. During this action the gears 29 will rotate in such direction and at such speed as to cause the sleeves 28 to slowly move the blocks 20 downwardly, and of course carrying the chains 22 downwardly therewith so that the top of the material within the body structure B will be continued to be skimmed or carried off until the body structure B is substantially empty of such material. It is only necessary to properly shift the sleeve 52 to effect the necessary rotation of the gears 29 to return the blocks 20 to their uppermost position. It is to be stated that in the present embodiment of the invention the shanks 26 at one end of the body structure are reversely threaded with respect to the shanks 26 at the opposite end portion of such structure so that the blocks 20 will be simultaneously raised or lowered.

Just about the time the blocks 20 reach their lowermost position and the body structure B is substantially empty, one of the blocks 20 will have contact with a button 75 to close a normally open circuit 76 for a sounding horn 77 or other signal whereby warning will be given to the occupant of the cab that the load carried by the body structure B has been emptied.

From the foregoing description it is thought to be obvious that a machine for spreading pulverized material constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. An apparatus of the class described comprising a portable body having side walls provided with vertically disposed slots in the opposite end portions thereof, vertically disposed guide members carried by the side walls exteriorly of the body and with which the slots communicate, shafts disposed transversely of the body and extending through the slots into the guide members, bearing blocks within the guide members with which the shafts are engaged, endless members engaged with the shafts, cross cleats connecting the endless members, threaded shanks operatively engaged with the blocks and extending upwardly beyond the guide members, means threading on said shanks for raising and lowering the shanks, and means for rotating the shafts.

2. An apparatus of the class described comprising a portable body having side walls provided with slots, guide members carried by the side walls exteriorly of the body and with which the slots communicate, said slots and guide members being vertically disposed, shafts disposed transversely of the body and extending within the guide members through the slots, blocks mounted within the guide members for up and down movement and with which the shafts are rotatably engaged, threaded shanks operatively engaged with the blocks and evtending upwardly beyond the guide members, rotatably members threading on the shanks for raising and lowering the shanks and blocks, means for rotating said members, and endless conveyor operatively engaged with the shafts, said conveyor being positioned within the body, the lower stretch of the conveyor being adapted for contact with the load within the body to skim off the top of the load, and means for rotating the shafts.

3. An apparatus of the class described comprising a portable truck including a transmission having a power take-off shaft, said body also having side walls provided with vertically disposed slots in the opposite end portions thereof, guide members carried by the side walls of the body and positioned exteriorly thereof and with which the slots communicate, blocks mounted within the guide members for up and down movement therein, shafts disposed transversely of the body and extending through the slots of the side walls into operative engagement with the blocks, a shaft carried by the body in driven connection with the power takeoff shaft, means operating from the second shaft for raising and lowering the blocks, an endless conveyor operatively engaged with the shaft extending transversely of the body, and means operated by the driven shaft for rotating said transverse shafts.

JAMES E. MILES.